United States Patent [19]
Kawai et al.

[11] Patent Number: 5,442,926
[45] Date of Patent: Aug. 22, 1995

[54] CONTROL SYSTEM FOR AIR-CONDITIONER

[75] Inventors: Tsuyoshi Kawai; Ryouichi Sekiya, both of Moriguchi, Japan

[73] Assignee: Sanyo Electric Co., Ltd., Osaka, Japan

[21] Appl. No.: 219,478

[22] Filed: Mar. 29, 1994

[30] Foreign Application Priority Data

Mar. 29, 1993 [JP] Japan .................................. 5-091929
Jul. 22, 1993 [JP] Japan .................................. 5-181565

[51] Int. Cl.$^6$ ............................................. F25B 49/00
[52] U.S. Cl. ......................................... 62/211; 62/126; 62/222
[58] Field of Search .................. 62/222, 210, 211, 126

[56] References Cited

U.S. PATENT DOCUMENTS 4,745,767  5/1988  Ohya et al. .............................. 62/211

FOREIGN PATENT DOCUMENTS

403267656  11/1991  Japan ................................... 62/222

*Primary Examiner*—William E. Wayner
*Attorney, Agent, or Firm*—Armstrong, Westerman, Hattori, McLeland & Naughton

[57] ABSTRACT

An improved control system for air conditioners. The control system detects temperatures at various points in the air-conditioner, and determines the model numbers of an indoor and an outdoor sections of the air-conditioner from these temperature data and a set of given status data associated with the air-conditioner. The control system may periodically set optimum control parameters in accordance with the model numbers and current status data of the air-conditioner and, in response to the refrigerant temperature at the outlet of compressor of its heat exchanger, may control the flow rate of the refrigerant passing through a variable expansion valve, thereby providing optimum refrigerating capacity at all times.

7 Claims, 12 Drawing Sheets

CHANGE IN TEMPERATURE AT THE OUTLET OF 4-WAY VALVE OVER ONE PERIOD (dpt)

FIG. 10

| p \ dpt | N | Z | S | M | L |
|---|---|---|---|---|---|
| S | 0 | 1 | 0 | 0 | 0 |
| M | 0 | 0.5 | 0 | 0 | -1 |
| L | 0 | 0 | 0 | -1 | -2 |
| LL | 0 | 0 | -1 | -2 | -2 |

| e \ de | NB | NS | ZR | PS | PB |
|---|---|---|---|---|---|
| NB | 4 | 3 | 2 | 0 | -1 |
| NS | 3 | 2 | 0 | 0 | -1 |
| ZR | 2 | 1 | 0 | -1 | -2 |
| PS | 1 | 0 | 0 | -2 | -3 |
| PB | 1 | 0 | -2 | -3 | -3 |

CONTROL SYSTEM FOR AIR-CONDITIONER

FIELD OF THE INVENTION

The invention relates to a control system for use in an air-conditioner, and more particularly, to a control system capable of dynamically controlling the opening of an expansion valve controlling the flow rate of refrigerant in an air-conditioner.

KNOWN ART

In order to maintain an air conditioned room at a preset temperature, the air-conditioner must be operated under control of a control system. In order to operate the air-conditioner in a stable state while maintaining its optimum refrigerating capacity, flow rate of the heat transfer medium or refrigerant must be controlled to meet this capacity requirement. For example, during a cooling operation (cooling mode), heat absorbed by the refrigerant in the room is transferred to an evaporator of the air-conditioner, which in turn liberates the heat to the open air outside the room. In this case it is preferable to run the air-conditioner (i.e. the compressor of the air-conditioner) at its maximum allowable power until the room is cooled to a preset temperature. Such maximum refrigerating capacity is generally obtained by appropriately controlling the opening of an expansion valve connected to the compressor, as shown in FIG. 1 and described in detail below.

Figure 1:
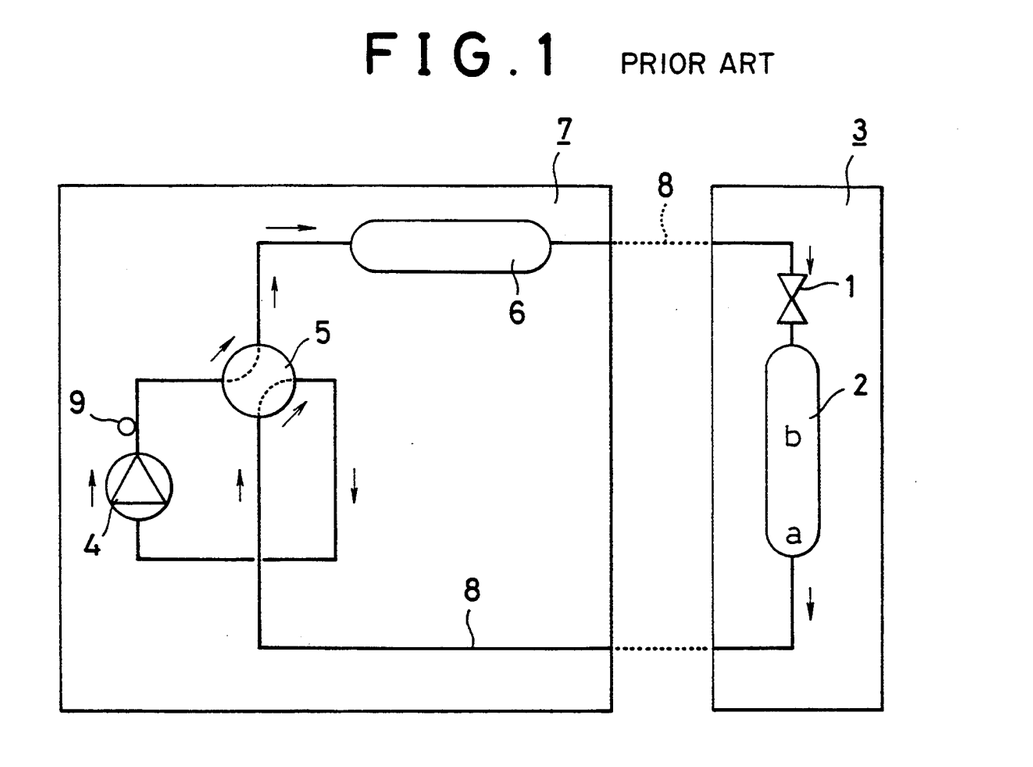
FIG. 1 is a schematic diagram of a typical refrigerant circuit in an air-conditioner operating in cooling mode.

FIG. 1 is a schematic diagram of a typical refrigerant circuit for use in air conditioners. The air-conditioner includes an indoor unit 3 having an expansion valve 1 and an indoor heat exchanger 2, and an outdoor unit 7 having a compressor 4, a four-way valve 5, and an outdoor heat exchanger 6. The indoor unit 3 and the outdoor unit 7 are connected with each other by pipes 8 forming a closed loop of refrigerant.

The expansion valve 1 is equipped with, for example, a stepping motor for regulating the opening of the expansion valve 1. The four-way valve 5 is provided to switch the passage of the refrigerant depending on the mode of the air-conditioner. For example, during cooling operations, the four-way valve 5 is set to cause the refrigerant to flow from the indoor heat exchanger 2 to the outdoor heat exchanger 6 through the four-way valve 5, the compressor 4 and then again the four-way valve 5, as shown in FIG. 1. In a heating mode of operation, the four-way valve 5 is switched to cause the refrigerant to flow from the outdoor heat exchanger 6 to the indoor heat exchanger 2 via the four-way valve 5, the compressor 4, and the four-way valve 5.

In the cooling operation, the indoor heat exchanger 2 serves as an evaporator, while the outdoor heat exchanger 6 serves as a condenser. They change their roles in the heating operation.

There are several known approaches to control air conditioners. In a method utilizing an expansion valve as mentioned above, the expansion valve 1 is commonly regulated based on the refrigerant temperature measured at the outlet of the compressor 4 or at the outlet of the four-way valve 5 by a temperature detector such as thermistor. The refrigerant temperature at these outlets are usually the same. The flow rate of the refrigerant is controlled by the the expansion valve 1 so as to bring this temperature to a preset desirable temperature as close as possible during steady state operation. In this manner, desired refrigerating capacity may be obtained through the control of the flow rate of the refrigerant. Operations of other auxiliary mechanical components are also controlled for maximization of the refrigerating capacity.

In a so-called super-heat control method (hereinafter referred to as SH method), the expansion valve 1 is controlled such that the difference in refrigerant temperatures measured by detectors at two different points in an evaporator (e.g. indoor heat exchanger 2) is maintained within a predetermined range, thereby providing desirable refrigerating capacity. The temperature may be measured at one point a near the outlet of the evaporator and at another b near the center of the evaporator, as shown in FIG. 1. The SH control method is suited for cases where it is physically or economically difficult to monitor the temperatures in the condenser (outdoor heat exchanger 6) and the compressor (compressor 4), since the SH control may be carried out only by information obtained from a single evaporator (indoor heat exchanger 2).

Another known control method is based on super-cooling of refrigerant in the heat exchanger. In all cases, in order to obtain desired performance, a control system must be set to have their relevant control parameters such as desirable temperature and control gain properly optimized based on measured parameters such as refrigerant temperatures in one or another of the components such as indoor heat exchanger 2 and outdoor heat exchanger 6.

However, any of the prior art control systems mentioned above is subject to a common problem that it is not possible to individually establish optimum control parameters for a particular combination indoor and outdoor sections 3 and 7, respectively, of air conditioners installed at customer's sites. This is due to the fact that such optimum parameters depends on the specific combination of the indoor unit 3 and the outdoor unit 7 chosen by a customer, but there are numerous types and different heat capacities of the indoor/outdoor sections (e.g. configuration of an air outlet of indoor unit, output power of the compressor 4 and blower power of the indoor unit 3), and hence a great number of combinations exists, which exceeds typically three hundreds. This makes it difficult to find a best or optimum set of control parameters for the chosen combination, thereby sacrificing the optimum performance of the air conditioners.

Therefore, it has been a common practice to apply a thumb-rule in estimation the optimum control parameters, and establishing them "as best as we can". A mismatch of the control parameters often renders the air-conditioner unstable. Apparently this is not a desirable optimization of a combination type air-conditioner.

In connection with the pertinent problem mentioned above, one should note that refrigerating capacity, and hence energy efficiency, of an air-conditioner must be higher for a higher desirable temperature at the outlet of the compressor (or the outlet of the four-way valve). However, at a higher desirable temperature, a compressor shutdown circuit provided for protection of the air-conditioner is more likely to be triggered if the refrigerant temperature reaches a preset threshold to prevent the compressor from reaching an excessive pressure therein. This invokes frequent shut down of the air-conditioner and resulting unstable operation thereof. Desirable temperature may be affected by other parameters such as the type (or model) of the compressor, environmental conditions of the site where the air-conditioner is installed, and the length of the connection pipe. Thus, the desirable temperature must be set with some consideration to these factors.

Figure 2:
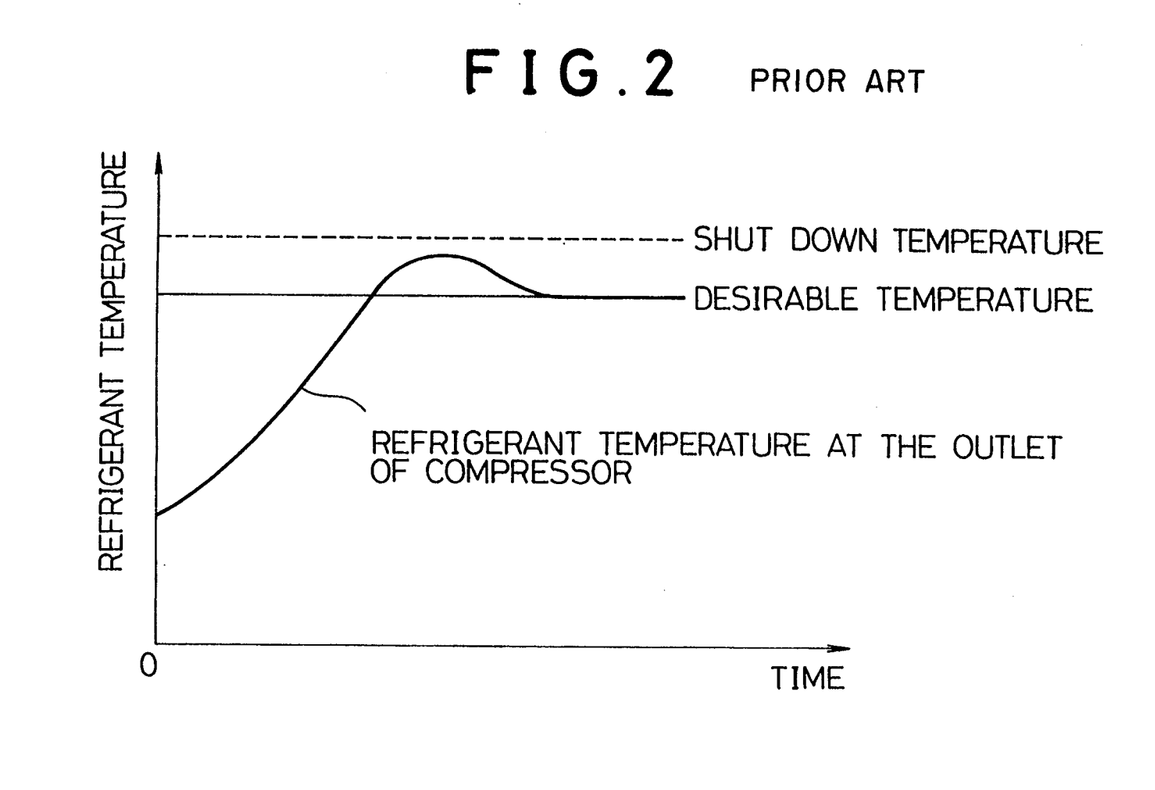
FIG. 2 is a graphical representation of a problem involved in conventional air-conditioner.

For this reason, in order to secure stable operation, the control system is usually set such that the compressor operates at a rather low operating temperature, sacrificing its maximum available refrigerating cpacity. As shown in FIG. 2, it is also important to note that during a start-up of the air-conditioner, the refrigerant temperature will temporally overshoot the desirable temperature at the outlet of the compressor. The maximum overshoot depends on the particular combination of the indoor and outdoor sections 3 and 7, respectively. Thus, in order to allow for the maximum overshoot and yet prevent a sudden shut down discussed above, the desirable temperature must be set appreciably lower than the maximum allowable temperature for the compressor. This also reduces the refrigerating capacity of the air-conditioner.

SUMMARY OF THE INVENTION

The invention is directed to solve such problem as described above by providing a novel automated control system for use in air-conditioner. The control system of the invention is capable of setting optimum control parameters, without any additional device or any manual operations, for controlling a desirable temperature for the refrigerant or the gain of the control system.

It is another object of the invention to provide a control system for use in air conditioners capable of setting an optimum desirable temperature at the outlet of the compressor thereof even when the air-conditioner has an arbitrary combination of indoor and outdoor sections having different thermal characteristics. The object is carried out by dynamically correcting the desirable temperature in response to the detected current temperature as well as its change at the outlet, so that, should thermal characteristics of the air-conditioner change, the desirable temperature may be dynamically modified or corrected to optimally compensate such changes.

In one aspect of the invention, there is provided a control system for use in an air-conditioner including an outdoor unit having at least a compressor and an outdoor heat exchanger, and an indoor unit having an expansion valve and an indoor heat exchanger, with the indoor unit and outdoor unit connected with pipes for circulating a refrigerant, the control system comprising: temperature detection means for detecting temperatures at a multiplicity of points in the air-conditioner; model number identification means for determining the model numbers of the indoor and outdoor sections from the temperatures detected by the temperature detection means and from status data representing the conditions of the indoor and outdoor sections; means for setting optimum control parameters in accordance with the indoor and outdoor sections; valve opening level correction means for controlling the opening of the expansion valve for an optimum flow rate of the refrigerant passing therethrough in accordance with the control parameters and in response to the current desirable temperature.

With this structure, the control system may identify for itself model numbers of the indoor and outdoor sections at the time of each startup, and set an optimum set of control parameters for that combination of the indoor and outdoor sections such that the flow rate of the refrigerant is controlled to provide an optimum performance of the air-conditioner in stable operation. During the operation, the control parameters are periodically corrected for dynamical optimization of the air-conditioner, thereby providing efficient and stable operation thereof.

Preferably, thermal data for use in such periodic correction of the control parameters includes at least the temperature of a room where the indoor unit is installed, temperature of the refrigerant at the outlet of the compressor, and degree of super-heating (degree of super cooling) of the indoor heat exchanger of the air-conditioner. The status data indicative of the conditions of various components of the air-conditioner preferably includes mode of operation (i.e. heating mode or cooling mode), opening of the expansion valve, and electric power frequency.

The model number identification means for may be a neural network having at least six input layers and two output layers. The input layers may receive: the heating/cooling mode, the degree of super-heating (degree of super cooling), the opening of the expansion valve, the electric power frequency, temperature of refrigerant at the outlet of the compressor, and the room temperature. The output layers may provide the output power of the compressor and the type (or configuration) of the air outlet of the indoor unit. The combination of the indoor and outdoor sections may be determined in terms of their model numbers from the data obtained from the output layer of the neural networks.

By the use of such neural network, and after certain training thereof, optimum control parameters may be estimated for a particular set of input data. Further, the initial and subsequent model numbers obtained from the model number identification means may be compared by an additional monitor to find trouble of the air-conditioner, as will be described in detail later. Such monitor may discern failure of the system by monitoring the difference between current and the initial model numbers. If the difference exceeding a predetermined value, it is attributed to malfunction of the air-conditioner. The monitor may provide the user with alarm in an early stage of malfunction.

In another aspect of the invention, there is provided a control system for use in an air-conditioner including an outdoor unit having at least a compressor and an outdoor heat exchanger, and an indoor unit having an expansion valve and an indoor heat exchanger, the indoor and outdoor units connected with pipes for circulating a refrigerant, the control system comprising: temperature detection means for periodically detecting refrigerant temperature at the outlet of compressor of the compressor; means for establishing a desirable temperature based on change in the refrigerant temperatures measured by the temperature detection means; means for storing said corrected desirable temperature as the current desirable temperature, together with previous desirable temperature; and valve opening level correction means for controlling the opening of the expansion valve for optimum flow rate of the refrigerant passing therethrough in accordance with the difference between the current desirable temperatures and the current refrigerant temperatures.

This control system is capable of setting a desirable temperature which permits overshoot of refrigerant temperature during a startup stage of air conditioning, and capable of modifying the desirable temperature to a higher optimum desirable temperature during a normal steady operation by periodically monitoring the change in refrigerant temperature at the outlet of compressor of the compressor and determining a correction to the current desirable temperature. Thus, the air-conditioner may operate with optimum refrigerating capacity at all times for an any combination of indoor and outdoor units, arbitrary length of the refrigerant pipe, and other environmental conditions.

In a further aspect of the invention, there is provided a control system for air-conditioner including an outdoor unit having at least a compressor and an outdoor heat exchanger, and an indoor unit having an expansion valve and an indoor heat exchanger, the indoor and outdoor sections connected with pipes for circulating a refrigerant, the control system comprising: temperature detection means for periodically detecting refrigerant temperature at the outlet of the compressor; means for establishing and correcting a desirable temperature based on change in the refrigerant temperatures measured by the temperature detection means; means for storing the corrected desirable temperature as the current desirable temperature, together with initial desirable temperature; and valve opening level correction means for controlling the opening of the expansion valve for optimum flow rate of the refrigerant passing therethrough in accordance with change in valve opening which is calculated from the current desirable temperature, change in the refrigerant temperatures, and change in the difference.

In this construction, the desirable temperature is corrected or modified periodically based not only on the change in the refrigerant temperature at the outlet of the compressor. Further, valve opening is controlled based not only on the difference between the modified desirable temperature and the current refrigerant temperature at the outlet of compressor but also on the change in the difference, so that further stability may be obtained in controlling the air-conditioner.

In this example, a well known fuzzy estimation approach may be used in calculating the desirable temperature and the change in valve opening for precise control of the expansion valve.

DETAILED DESCRIPTION OF THE PREFERRED EMBODIMENT

Figure 3:
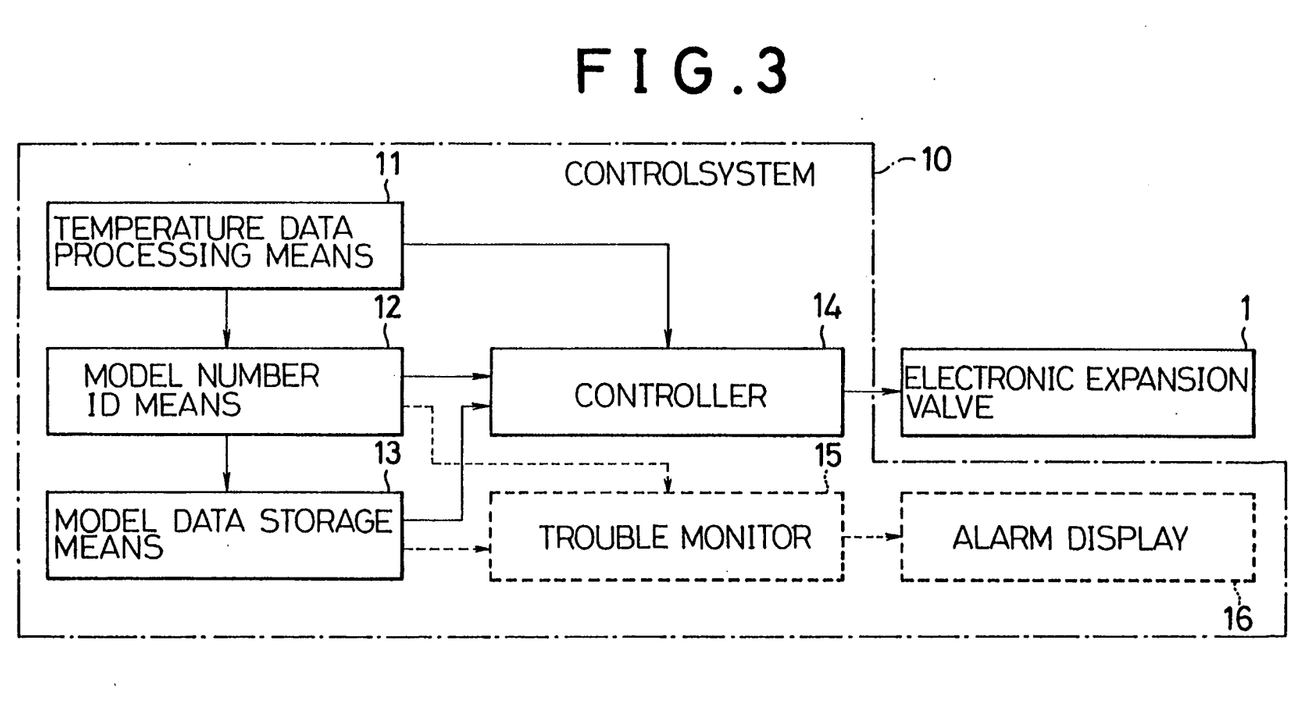
FIG. 3 is a block diagram of a first control system for use in air conditioners in accordance with the invention.

The invention will be now described with reference to the accompanying drawings, FIG. 1 also shows a general structure of a refrigerant circuit for which the present invention is applicable. Referring now to FIGS. 3–6, there is provided a first example of the invention. As shown in FIG. 3, a control system 10 of the invention includes temperature data processing means 11 for processing measured temperatures, model number identification means 12, model number storage means 13, a controller 14, a trouble monitor 15, and an alarm display 16. The control system 10 is adapted to control the variable opening of an expansion valve 1, as described in detail later.

In the example shown, the expansion valve 1 may be driven by a stepping motor which regulates the opening of the valve by one step for each pulse received from the controller 14. There are in total five hundred steps or levels of opening, which are calibrated such that step 0 corresponds to completely closed state and step 500 corresponds to fully opened state of the expansion valve 1. The opening is initially set to step 250, which corresponds to half the maximum opening.

The temperature data processing means 11 processes detected temperatures measured by temperature detection means 9 at various points of the air-conditioner, for example temperature measured at the outlet of the compressor 4 and room temperature, refrigerant temperature in the indoor heat exchanger 2 in the room. The model number identification means 12 is programmed to estimate the most likely model of the indoor and outdoor sections from data such as given temperature distribution and the frequency of the power source. The model number identification means 12 determine the model numbers when it is initialized and periodically continues the determination of the model numbers during subsequent operation using the current temperature distribution, and compared the initial and the current model numbers to thereby detect chronological change in heating/cooling characteristics of the air-conditioner in the terms of "model numbers." This comparison may be utilized to detect trouble of the air-conditioner, as described further below. The model data storage means 13 is provided to store data indicative of model numbers received from the model number identification means 12.

The controller 14 sets an optimum control parameters in accordance with the model identification data, and calculates a number of pulses required to correct the opening of the expansion valve by a stepping motor. The trouble monitor 15 compares estimated model numbers with their initial model numbers and provides an alarming signal to an alarm display 16 when the difference exceeds a predetermined threshold, indicating that the air-conditioner has failed to sustain normal operating conditions. The alarm display 16 receives the alarm signal and display an alarming sign.

The trouble monitor 15 and the alarm display 16 may be optionally added to the control system, as indicated by a phantom connection in FIG. 3.

As described above the control system identifies the combination of the indoor and outdoor sections not only at the time of first operation but also in subsequent operations to renew the control parameters. This is desirable for optimum operation because the initially set control parameters are not necessarily optimum for the air-conditioner used over a certain period of time and acquiring chronological changes.

In this example, the output power of the compressor 4 is estimated from the refrigerant temperatures at the outlet of the compressor 4 and the opening level of the valve 1. It should be understood that the estimated output power also depends on other factors such as degree of super-heating(degree of super-cooling) of the indoor heat exchanger 2 and outdoor heat exchanger 6 as well as on the frequency of the power supply, and that the estimation is made with these factors taken into account.

The super-heating/cooling level of the indoor unit depends on the configuration of the air outlet of the indoor unit during cooling/heating operation. The invention may estimate the type or configuration of the air outlet by measuring a temperature distribution over a portion of the connection pipe inside the indoor unit by means of a multiplicity of temperature detectors. It should be understood that this temperature distribution depends on the room temperature and the opening level of the expansion valve, so that these factors are also taken account in the above estimation of the air outlet configuration.

Figure 4:
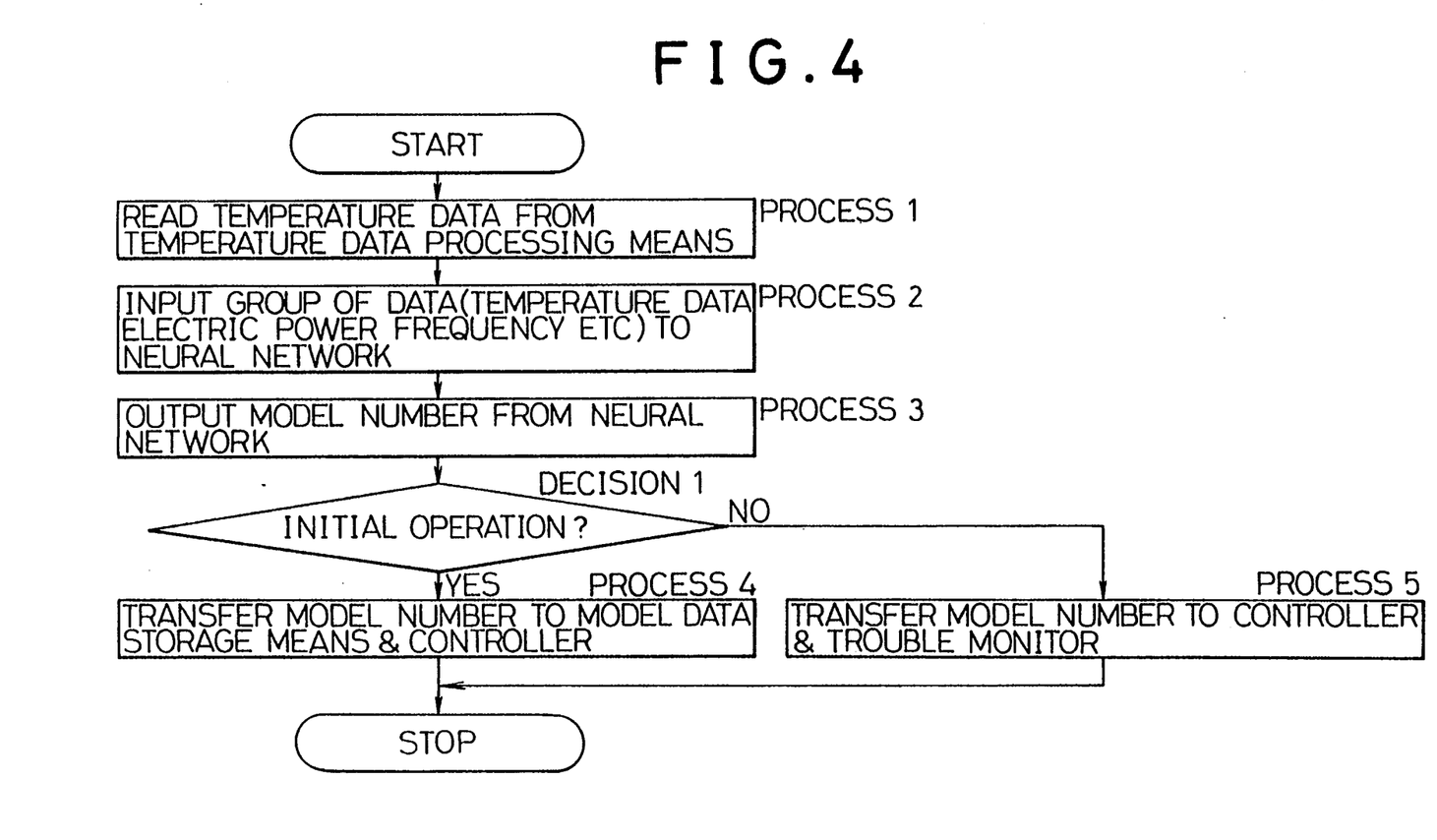
FIG. 4 is a flowchart illustrating processes performed for identification of model numbers of the air-conditioner shown in FIG. 3.

When required data of temperature such as refrigerant temperature at various points of the air-conditioner and room temperature are collected in temperature data processing means 11, the model number identification means 12 performs data processing as shown in FIG. 4.

The precess starts with reading the temperature data from the temperature data processing means 11 (PROCESS 1), which are input to the input layers of a neural network (NN) along With other data such as electric power frequency (PROCESS 2).

Figure 5:
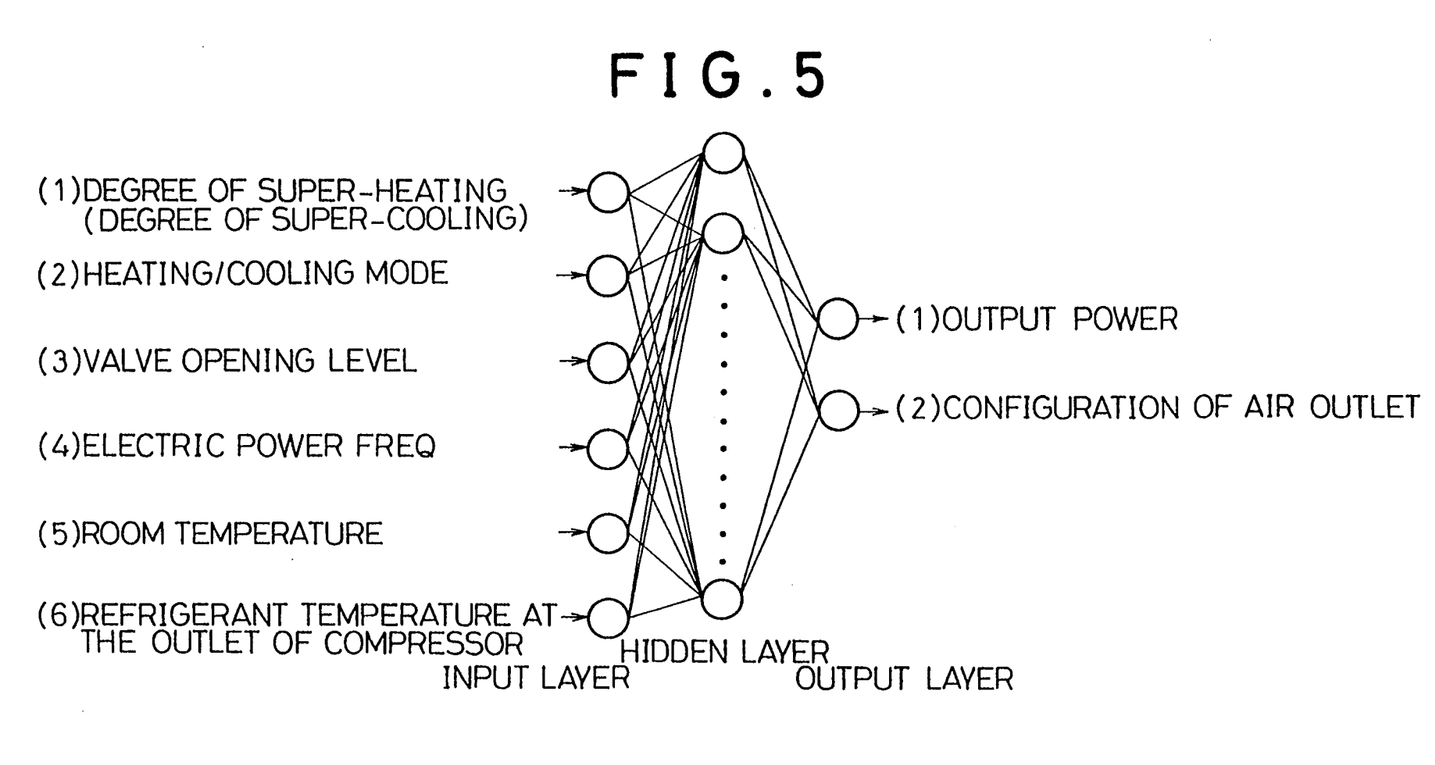
FIG. 5 shows an exemplary neural network for use in the model identification processes of FIG. 3.

The example described herein has 6 input layers for receiving: the degree of super-heating/cooling (layer 1); heating/cooling mode (layer 2); opening level of the expansion valve (layer electric power frequency (layer 4); room temperature (layer 5); and refrigerant temperature at the outlet of the compressor (layer 6), as shown in FIG. 5. The values 0 and 1 are assigned to cooling and heating modes, respectively. In the heating operation, the evaporator will be super-cooled.

The network NN has two output layers for providing compressor output power (in horse power) (layer 1) and air outlet configuration (layer 2). The air outlet configurations are output in the form of integers assigned thereto.

Prior to installation, the neural network is supplied with a set of experimental data or simulation data regarding the above mentioned parameters for a specific type of air-conditioner. This causes the network to learn optimum control parameters for that type of the air-conditioner. This procedure is repeated for different but typical types of air conditioners, so that the network NN acquires a multiple set of optimum control parameters for respective types of the air conditioners. That is, the network learns how to establish optimum control parameters for a given category of air conditioners. Furthermore, after this learning, the network NN will be able to estimate best control parameters even when a new set of input data is given, and provide an optimum set of output data.

As an example, given an arbtrary fictitious temperature of 22° C. to the input layer of the network shown in FIG. 5, the network will estimate the best or optimum values of the air-conditioner output power and of air outlet configuration to the output layers 1 and 2, respectively, for that room temperature. Thus, it is not necessary to teach the network all possible combinations of air conditioners, but it suffices to teach the network only typical combinations. That is, after teaching the network NN of the control system, it is able to estimate the most probable type of the air-conditioner, and then provide an optimum output power of the air-conditioner (output layer 1) and the most probable model number representing the configuration of the air outlet of the air-conditioner (PROCESS 3).

Next, a determination is made whether or not the operation is the initial one (determination 1). If it is, then the model number already estimated and stored in a memory is transferred to the model data storage means 13 and the controller 14 (step 4). On the other hand, if it is not, then the data is transferred to the controller 14 and the trouble monitor 15 (step 5).

In the initial operation mentioned above, appropriate (i.e. optimum) values of the control parameters for the initial operation are set in the controller 14. In this case, if PID control is used, P, I, and D terms are preset to their default values defined for a standard air-conditioner. If a fuzzy control is used, standard membership function and a standard control rule are preset in the controller 14.

In order to allow the control system to establish optimum control parameters based on the model numbers estimated in the preceding process 3, use is made of optimum values established beforehand for that set of model numbers and stored in a memory. That is, the optimum values are read from the memory and set as the optimum control parameters for the model numbers. Alternatively, weighting factors may be defined for respective control parameters with respect to each model number so that corresponding weighted control parameters are provided, when the model numbers are determined in process 3.

Figure 6:
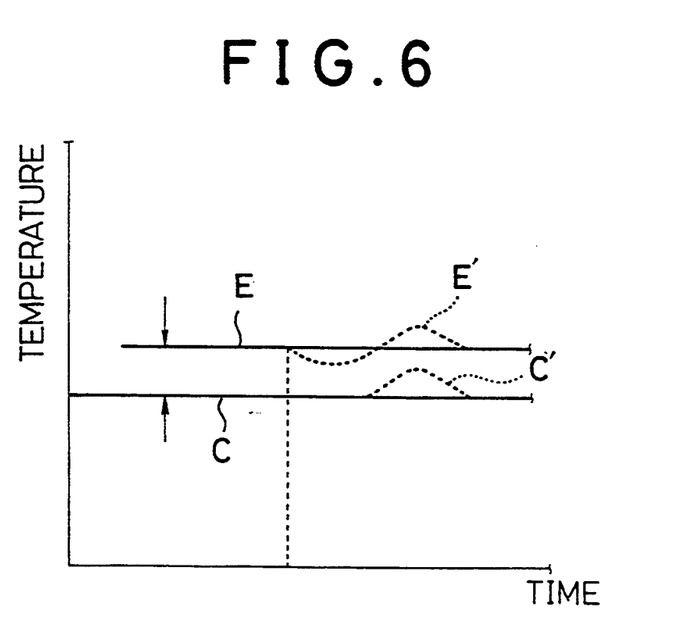
FIG. 6 is a graphical representation illustrating operational characteristics of the control system of FIG. 3.

The controller 14 then uses a control algorithm in calculating the number of pulses for opening/closing the expansion valve by the same number of steps from the control parameters set in the preceding process. In SH control method, the number is determined from the difference between the actually measured super-heating level ec' and current reference super-heating level ec, where ec is defined by the difference between the refrigerant temperature e near the outlet of the evaporator and the refrigerant temperature c at the center of the evaporator, and prime implies measured values, as shown in FIG. 6. The valve 1 is driven so that this difference between ec and ec' is minimized by a PID control or a fuzzy estimation using the difference, the change in the difference, and the integration of the difference over two successive periods. The number of pulses thus calculated is transferred to the expansion valve 1.

In subsequent operations, the controller 14 compares the model number data, periodically transferred from the model number identification means 12, with the model number data stored in the model data storage means 13 to obtain the difference between them. If the difference exceeds a predetermined magnitude, it is considered as a chronological change to be corrected, and the control parameters are updated to harmonize with the newest model number. At the same time, the trouble monitor 15 also compares the two data and causes the alarm display 16 to display a alarming sign when the difference exceeds a predetermined level. Such alarm implies that a serious defect exists in the air-conditioner.

It should be appreciated that through the estimation of the model number by the network NN very accurate dynamic control of the refrigerant flow rate may be attained for all types of air conditioners.

That is, no costly multiple switches nor tedious manual adjusting operations are needed for complete setting of control parameters, since the types of the components are determined automatically. This is true not only in initial setting but also in any subsequent operation, since chronological changes in the components may be automatically compensated by optimization of the control parameters.

Although a neural network is used in the example described above, a fuzzy controller may be used alternatively in establishing relationships between six input layers and two output layers, using membership function and a fuzzy rule associated with the membership function.

Referring now to FIGS. 7-14, there is shown a second embodiment of the invention, in which desirable temperature is corrected based on the refrigerant temperature at the outlet (OUTLET TEMPERATURE) of the compressor 4 and the change in the OUTLET TEMPERATURE.

Figure 7:
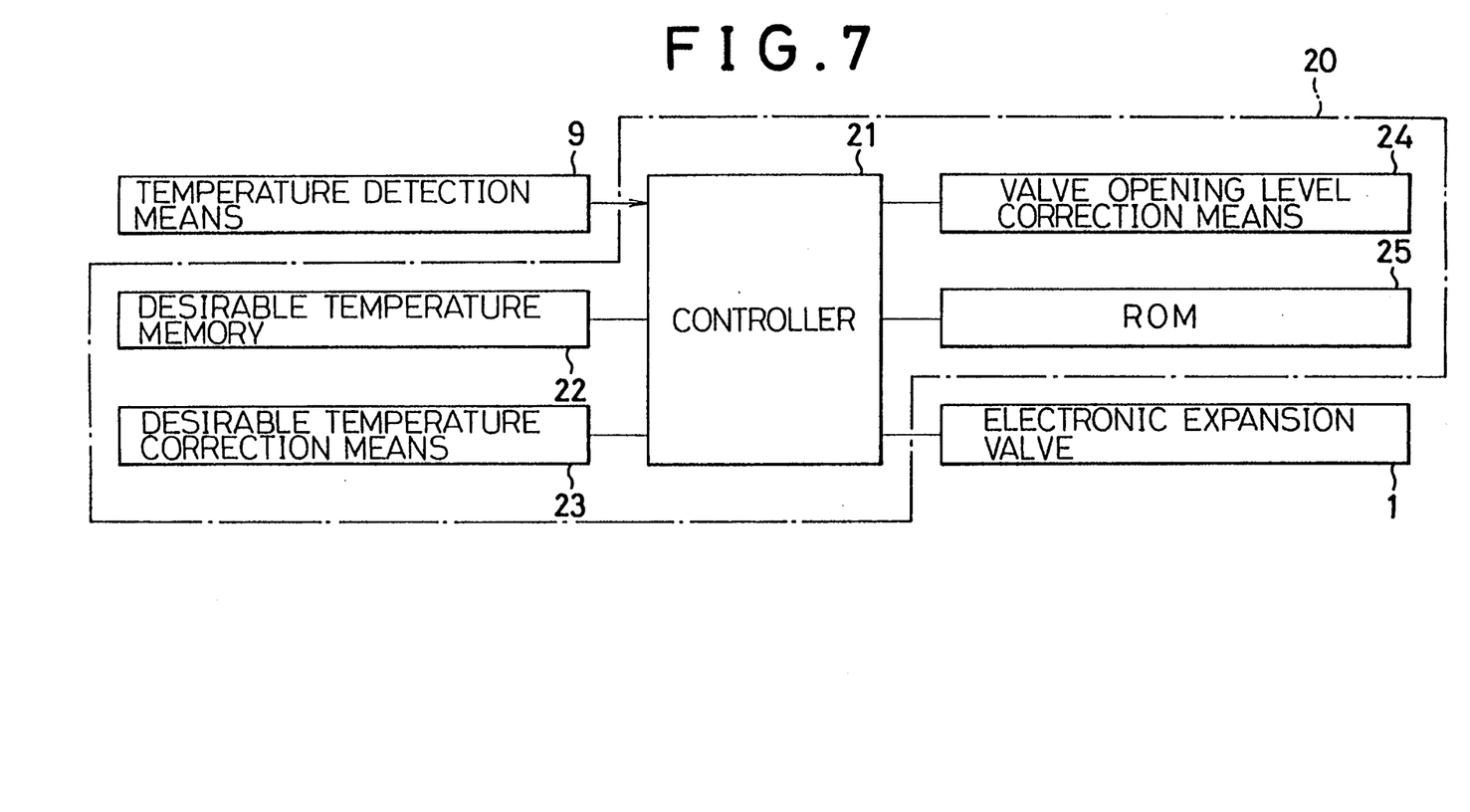
FIG. 7 is a block diagram representation of a second control system for use in air-conditioner in accordance with the invention.

As shown in FIG. 7, a control system 20 for controlling the opening of an expansion valve 1 includes a controller 21, memory means 22, desirable temperature correction means 23 for calculating correction for the desirable temperature, valve opening level correction means 24 for calculating change in valve opening, and a ROM 25.

The controller 21 is provided with the OUTLET TEMPERATURE detected by the temperature detector 9 mounted at the outlet of the compressor 4. The OUTLET TEMPERATURE is the same as the refrigerant temperature at the outlet of the four-way valve 5. The memory means 22 may be a RAM for storing the desirable temperature to be compared with OUTLET TEMPERATURE. The initial default desirable temperature is 75° C., which is also stored in the RAM memory means 22. The controller 21 receives OUTLET TEMPERATURE from the temperature detector 9 every five seconds.

When instructed by the controller 21, the desirable temperature correction means 23 calculate an amount of correction for the desirable temperature stored in the memory means 22 and establishes a corrected desirable temperature (hereinafter referred to as corrected temperature) by fuzzy estimation based on temperature data supplied from the temperature detector 9 and changes in the temperature data, as described in detail below. The controller 21 also instructs the valve opening level correction means 24 to estimate necessary change in valve opening of the expansion valve 1 by fuzzy estimation. This estimation is based on the detected temperature data supplied from the temperature detector 9 and the corrected temperature calculated by the desirable temperature correction means 23. The ROM 25 stores a program for controlling the desirable temperature correction means 23, the valve opening level correction means 24, and the expansion valve 1. Opening/closing operation of the valve 1 may be performed by a stepping motor as in the first example described above.

Fuzzy estimation of temperature correction performed in the desirable temperature correction means 23 will be now described in detail.

inputs for the fuzzy estimation (fuzzy controller) includes refrigerant temperature at the outlet of the four-way valve (OUTLET TEMPERATURE) pt detected by the temperature detector 9 and change dpt in pt over a predetermined period of time. Outputs of the fuzzy estimation includes change dt in the desirable temperature for the OUTLET TEMPERATURE. The initial value of dpt is set to 0.

Figure 8:
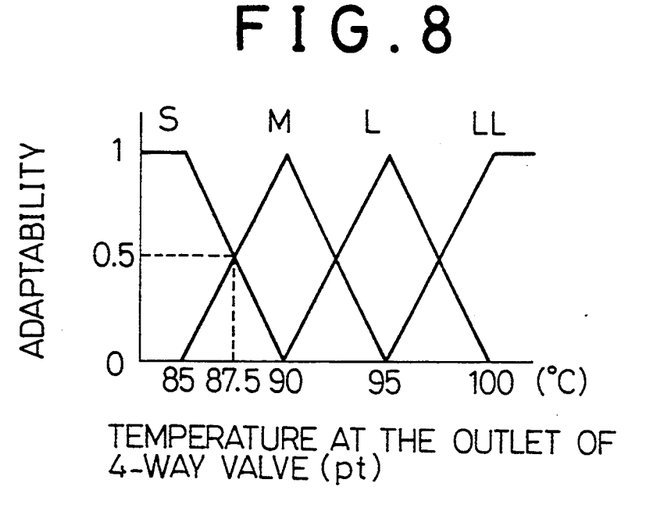
FIG. 8 is a graphical representation of inputs for a membership function used for fuzzy estimation of a change in the desirable temperature based on the refrigerant temperature at the outlet of the four-way valve.

Referring now to FIG. 8, there is shown an input membership function representing the adaptability $\mu_1$ of the OUTLET TEMPERATURE pt, which is defined in terms of four functions: (a) function S for pt not more than 90° C., (b) function M for pt in the range between 85° C. and 95° C., (c) function L for pt in the range between 90° C. and 100° C., and (d) function LL for pt not less than 95° C. These functions are stored in the ROM 25.

Figure 9:
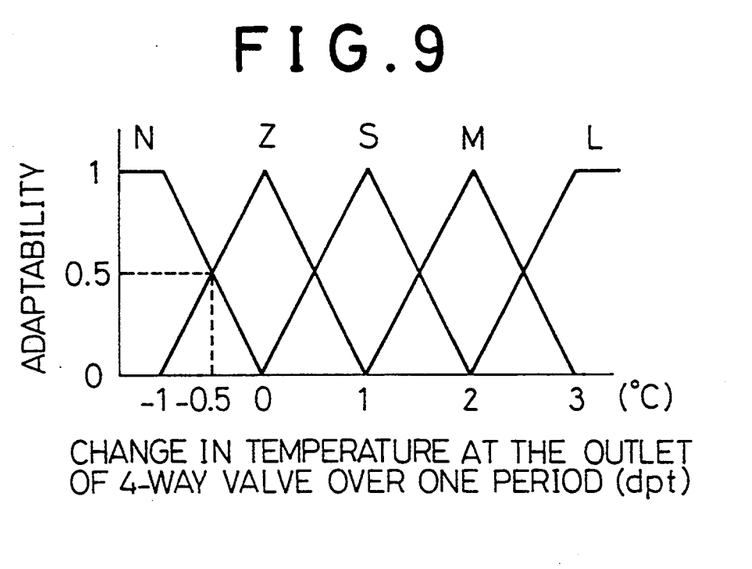
FIG. 9 is a graphical representation of input membership function for fuzzy estimation of a change in the desirable temperature based on the change in the refrigerant temperature at the outlet of the four-way valve.

FIG. 9 shows an input membership function representing the adaptability $\mu_2$ of the OUTLET TEMPERATURE CHANGE dpt, which is defined in terms of five functions and stored in the ROM 25: (a) function N for negative dpt; (b) function Z for dpt in the range between $-1°$ C. and 1° C.; (c) function S for dpt in the range between 0° C. and 2° C.; (d) function M for dpt in the range between 1° C. and 3° C.; and (e) function L for dpt not less than 2° C.

Figure 10:
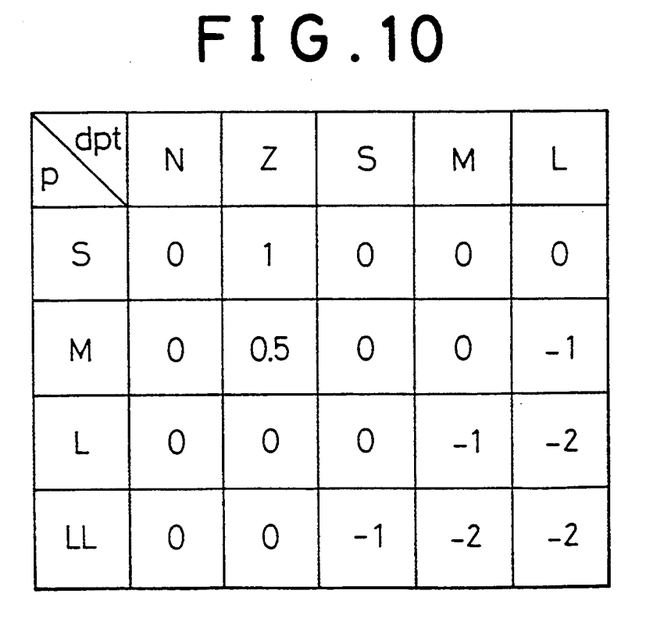
FIG. 10 is a tabulated form of a control rule governing the fuzzy estimation of the desirable temperature change.

The value dt representing a change in the desirable temperature for the OUTLET TEMPERATURE is calculated from the adaptability $\mu_1$ and $\mu_2$ using a control rule stored in the ROM 25 and shown in FIG. 10.

As an example, if the OUTLET TEMPERATURE pt is 87.5° C. and OUTLET TEMPERATURE CHANGE dpt is $-0.5°$ C., the adaptability $\mu_1$ of the pt turns out to be 0.5 for S, 0.5 for M, 0 for L, and 0 for LL, and the adaptability $\mu_2$ of dpt to be 0.5 for N, 0.5 for Z, 0 for S, 0 for M, and 0 for L. Thus, the following control rule is established:

(a) dt=0($\mu_3$=0.5) if pt=S($\mu_1$=0.5), dpt=N($\mu_2$=0.5)
(b) dt=1($\mu_3$=0.5) if pt=S($\mu_1$=0.5), dpt=Z($\mu_2$=0.5)
(c) dt=0($\mu_3$=0.5) if pt=M($\mu_1$=0.5), dpt=N($\mu_2$=0.5)
(d) dt=0.5($\mu_3$=0.5) if pt=M($\mu_1$=0.5), dpt=Z($\mu_2$=0.5)

An adaptability $\mu_3$ of the output is defined to be the smaller one of the $\mu_1$ and $\mu_2$, which is calculated based on the control rule and using a so-called MIN-MAX method.

In this example, adaptability $\mu_3$ for dt=0 is defined to be 0.5, since $\mu_3$0.5 for dt=0 as given by the sub-rules (a) and (c). Should the control rule gives two different values for the adaptability $\mu_3$ for the same value of dt, a larger one of them is taken as the true adaptability $\mu_3$.

The amount of correction dt in OUTLET TEMPERATURE is determined by the following formula:

$$dt = \frac{\Sigma(\mu_3 * dt)}{\Sigma\mu_3} = \frac{0*0.5 + 1*0.5 + 0.5*0.5}{0.5 + 0.5 + 0.5} = 0.5$$

Thus, the correct desirable temperature should be the current desirable temperature plus 0.5. The corrected desirable temperature is defined to be the current desirable temperature to after the correction.

Fuzzy estimation of valve opening change dv performed in the valve opening level correction means 24 will be now described.

In this estimation, error e is defined as the corrected temperature tc obtained by the desirable temperature correction means 23 minus the OUTLET TEMPERATURE of the four-way valve, and a change in e over the predetermined period of time is defined as de. The initial value of de is set to 0 in this example and stored in the ROM 25. The valve opening change dv is of the outputs of the fuzzy controller.

Figure 11:
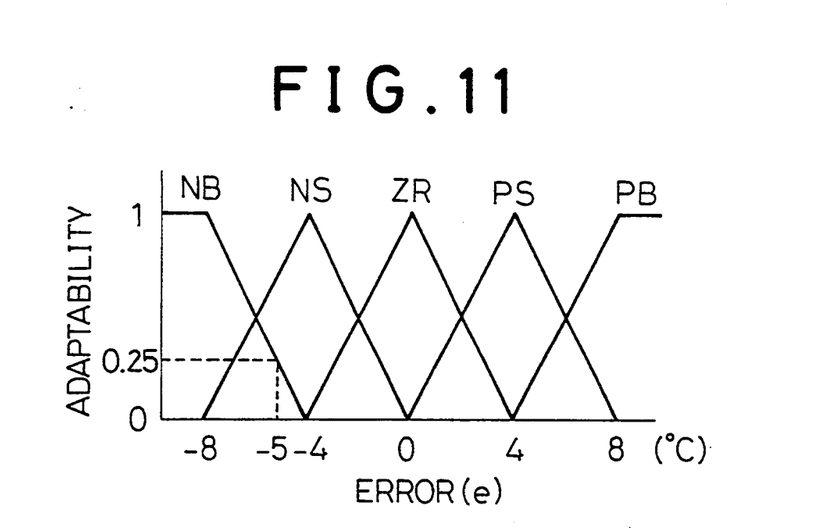
FIG. 11 is a graphical representation of input membership function for fuzzy estimation of valve opening adjustment based on error input.

As shown in FIG. 11, a membership function representing adaptability $\mu_4$ for e is defined as follows.
(a) function NB for e ≦ −4° C.,
(b) function NS for −8° C.≦ e ≦ 0° C.,
(c) function ZR for −4° C.≦ e ≦ 4° C.,
(d) function PS for 0° C.≦ e ≦ 8° C.,
(e) function PB for 4° C.≦ e.
These functions are stored in the ROM 25.

Figure 12:
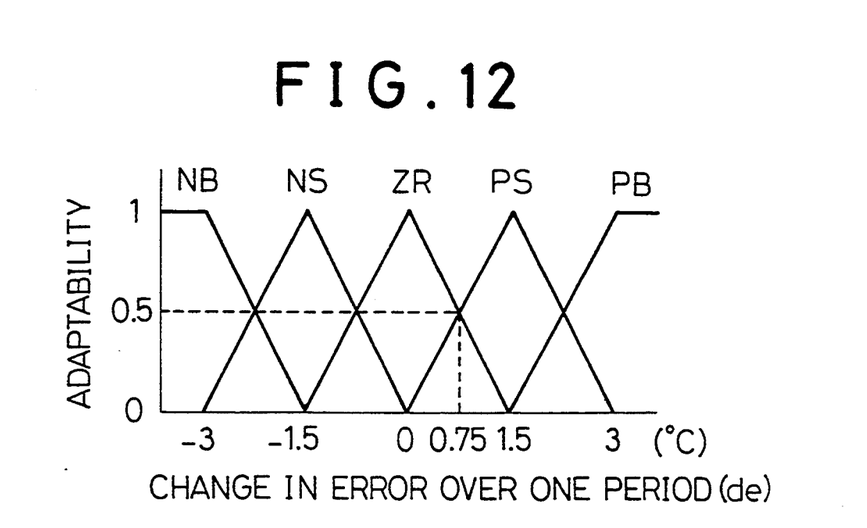
FIG. 12 is a graphical representation of input membership function for fuzzy estimation of change in valve opening adjustment based on error input.

As shown in FIG. 12, a membership function representing the adaptability $\mu_5$ for the difference de is defined as follows:
(a) function NB for de ≦ −1.5° C.,
(b) function NS for −3° C.≦ de ≦ 0° C.,
(c) function ZR for −1.5° C.≦ de ≦ 1.5° C.,
(d) function PS for 0° C.≦ de ≦ 3° C.,
(e) function PB for 1.5° C.≦ de.
This definition is also stored in the ROM 25.

Figure 13:
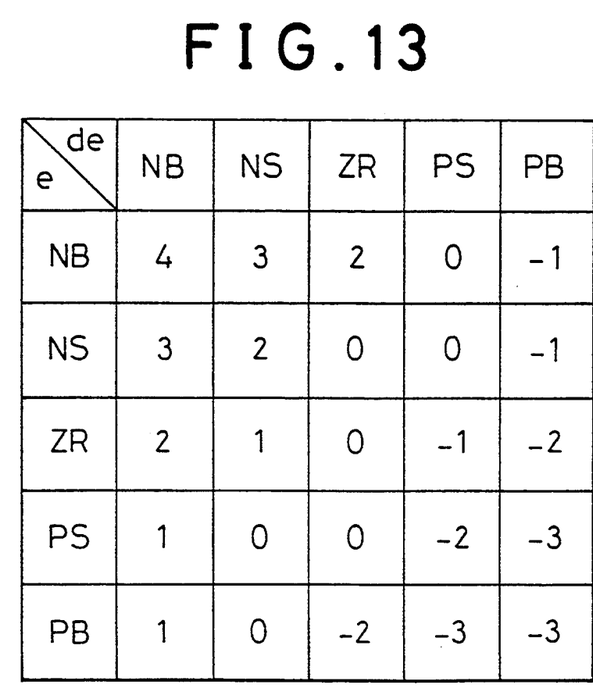
FIG. 13 is a tabulated form of a control rule governing the fuzzy estimation of the change in valve opening adjustment.

The valve opening change is calculated using the input adaptability $\mu_4$ and $\mu_5$ and a control rule stored in the ROM 25 and shown in FIG. 13.

For example, in accordance with the definition of the membership function, if e = −5° C. and de = 0.75° C., then the input adaptability $\mu_4$ for e turns out to be 0.25 for NB; 0.75 for NS; 0 for ZR; 0 for PS; 0 for PB, and input adaptability $\mu_5$ for de to be 0 for NB; 0 for NS; 0.5 for ZR; 0.5 for PS; and 0 for PB. Thus, the following control rule hold.
(a)  dv=0($\mu_6$=0.25)  for  e=NB($\mu_4$=0.25), de=PS($\mu_5$=0.5)
(b)  dv=0($\mu_6$=0.5)  for  e=NS($\mu_4$=0.75), de=PS($\mu_5$=0.5)
(c)  dv=2($\mu_6$=0.25)  for  e=NB($\mu_4$=0.25), de=ZR($\mu_5$=0.5)
(d)  dv=0($\mu_6$=0.5)  for  e=NS($\mu_4$=0.75), de=ZR($\mu_5$=0.5)

As in the calculation of the desirable temperature correction, an adaptability $\mu_6$ of the output is defined to be the smaller one of the two adaptability $\mu_4$ and $\mu_5$ as determined by a MIN-MAX method. The adaptability $\mu_6$ is defined as the adaptability of the outputs.

In this example, the adaptability $\mu_6$ for dv = 0 is 0.5, since sub-rule (b) and sub-rule (d) have a greater value of adaptability $\mu_6$ than sub-rule (a).

Thus, the valve opening change dv is given by the following formula in terms of a weighted average of the dv's.

$$dv = \frac{\Sigma(\mu_6 * dv)}{\Sigma\mu_6} = \frac{2*0.25 + 0*0.5}{0.5 + 0.25} = -0.5.$$

In the example, the value of dv thus obtained is rounded to the closest integer. Thus, v is evaluated as −1 in the example shown above, implying reverse motion of the stepping motor by one step, which in turn implies that the opening of the expansion valve is decreased by one level.

Figure 14:
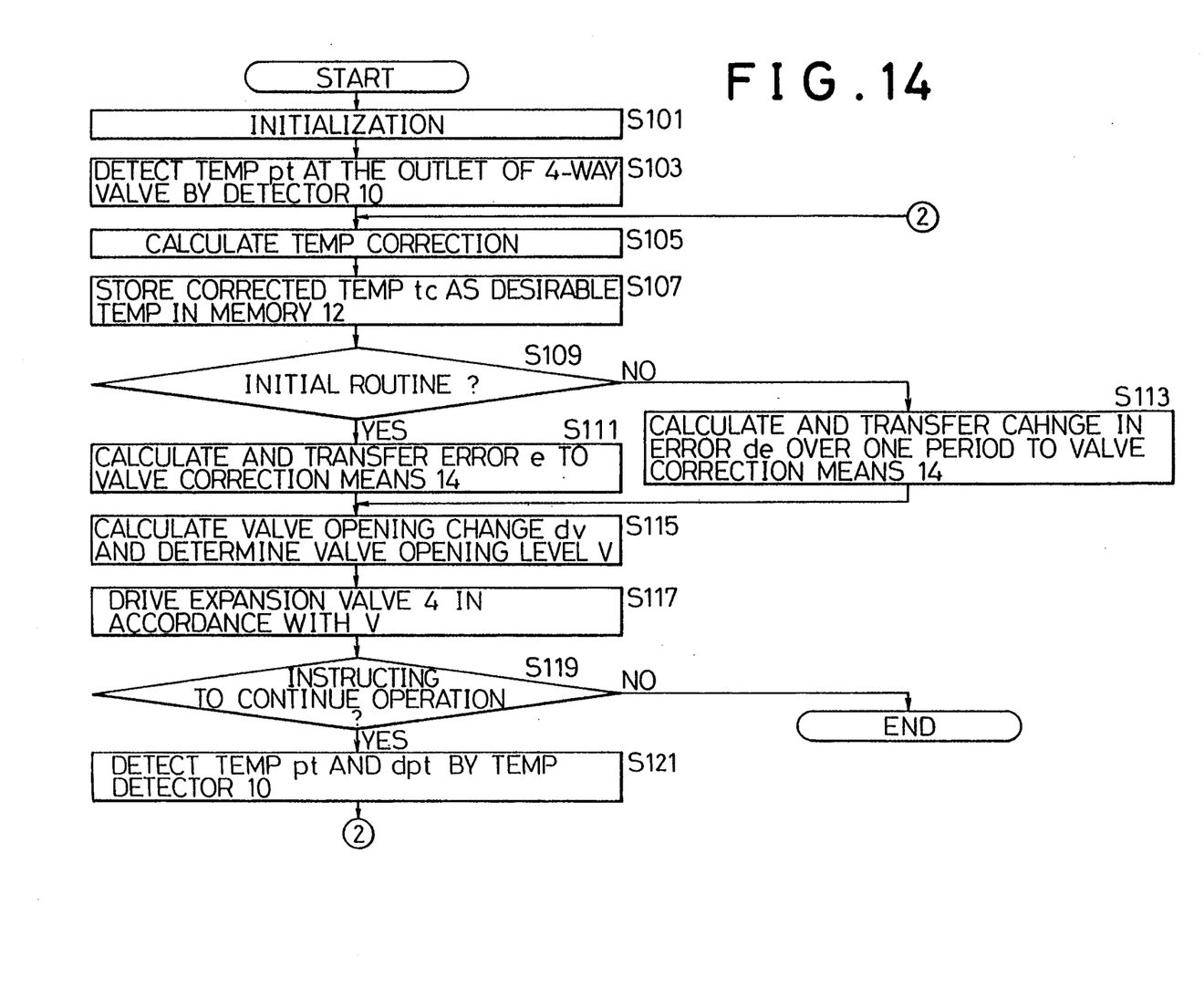
FIG. 14 is a flowchart illustrating operation of the control system of FIG. 7.

Referring now to FIG. 14, there is shown a process taken by the control system of the invention controlling the refrigerant flow rate through the expansion valve 1.

In the initialization step S101, the values of OUTLET TEMPERATURE CHANGE dpt and difference de are both set to 0. In the next step S103, OUTLET TEMPERATURE pt is detected by temperature detector 9.

Next, in step S105, values of pt, dpt, and desirable temperature T stored in the memory 22 are supplied to the desirable temperature correction means 28 for fuzzy estimation of corrected temperature Tc.

The desirable temperature T in the memory means 22 is updated by this corrected temperature Tc in step S107.

The precess then proceeds to step S109, where a determination is made whether the operation is an initial routine or not. If it is, the process proceeds to step S111, where the error e is calculated from the corrected temperature Tc and OUTLET TEMPERATURE pt. The values of e and its change de = 0 are provided to the valve opening level correction means 24. The process then proceeds to step S115.

On the other hand, if the operation is not the initial routine, the procedure branches to step S113, where the error e and its change $de = e - e_o$ are calculated from the corrected temperature Tc, OUTLET TEMPERATURE pt, and previous error $e_o$. The values of e and de thus obtained are supplied to the valve opening level correction means 24. The process then proceeds to step S115.

In step S115, a valve opening change dv is calculated from e and de using fuzzy estimation. The value of dv is rounded to the closest integer V before it is given to the stepping motor of the valve. The rounded value V represents the number of driving steps of the stepping motor, which is also a change in valve opening level.

The process further proceeds to step S117, where the expansion valve 1 is opened/closed by the amount V obtained in step S115, and proceeds to the next step S119.

In step S119, a query is raised whether the control system is issuing an instruction to continue the operation of the air-conditioner. If so, the process proceeds to step S121, where the control system 10 detects the OUTLET TEMPERATURE pt. Also, OUTLET TEMPERATURE CHANGE dpt (= current pt − previous pt) is calculated. The process then returns to step S105 to repeat all the steps down to S119 as described above.

On the other hand, if the instruction is not issued, the process is ended.

As described above, the invention may control the desirable temperature itself for the refrigerant at the outlet of the four-way valve (or equivalently at the outlet of the compressor) based on the refrigerant temperature and its change at that point. That is, the desirable temperature is continually optimized to meet the requirement of the air-conditioner by following any change in the thermodynamic state of the air-conditioner. Thus, the invention not only establishes optimum control for an arbitrary air-conditioner at the time of its installation but also allows the air-conditioner to operate near the shut down temperature during its steady operation.

Although in the embodiment described above assumes fuzzy estimation in calculating the desirable temperature tc and the valve opening change V by the desirable temperature correction means 23 and the valve opening level correction means 24, respectively, any linear method such as PID control method may be alternatively used for this purpose. However, since linear methods may control various parameters only linearly, the control system utilizing a linear method would have poorer dynamic characteristics than the example described above utilizing fuzzy estimation.

It should be understood also that the four-way valve used in the example described above is not inevitable in practicing the invention, and that the invention may be applied to air conditioners not equipped with such four-way valve.

What we claim is:

1. A control system for use in an air-conditioner including an outdoor unit having at least a compressor and an outdoor heat exchanger, and an indoor unit having an expansion valve and an indoor heat exchanger, said indoor and outdoor sections connected with pipes for circulating a refrigerant, said control system comprising:
   temperature detection means for detecting temperatures at a multiplicity of points in the air-conditioner;
   means for processing data indicative of said detected temperatures into temperature data;
   model number identification means for determining the model numbers of said indoor and outdoor sections from said temperature data received from said data processing means, and a given set of status data associated with indoor and outdoor sections;
   means for establishing optimum control parameters in accordance with said model numbers of said indoor and outdoor sections;
   valve opening level correction means for controlling the opening of said expansion valve for an optimum flow rate of said refrigerant passing therethrough in accordance with said control parameters.

2. A control system as claimed in claim 1, wherein temperature data provided by said temperature detecting means includes at least:
   room temperature where the indoor unit is installed;
   refrigerant temperature at the outlet of compressor of the compressor;
   super-heating/super-cooling level of said indoor heat exchanger; and wherein said status data include:
   heating/cooling mode;
   opening level of the expansion valve of said air-conditioner; and
   electric power frequency of a power supply.

3. A control system as claimed in claim 1, wherein said means for identifying the model numbers is a neural network having at least six input layers and two output layers, said input layers including: heating/cooling mode;
   super-heating/super-cooling level;
   opening level of said expansion valve;
   electric power frequency; and
   room temperature, and
said output layers including:
   output power of said compressor; and
   type of the air outlet of said indoor unit.

4. A control system as claimed in claim 1, further comprising
   means for detecting trouble of said air-conditioner by comparing said model numbers of indoor and outdoor sections which are initially obtained with corresponding model numbers which are obtained at a later time, and by comparing the differences of said model numbers with predetermined values.

5. A control system for air-conditioner including an outdoor unit having at least a compressor and an outdoor heat exchanger, and an indoor unit having an expansion valve and an indoor heat exchanger, said indoor and outdoor sections connected with pipes for circulating a refrigerant, said control system comprising:
   temperature detection means for periodically detecting refrigerant temperature at the outlet of said compressor;
   means for establishing and correcting a desirable temperature based on change in the refrigerant temperatures measured by said temperature detection means;
   means for storing said corrected desirable temperature as the current desirable temperature, together with previous desirable temperature; and
   valve opening level correction means for controlling the opening of the expansion valve for optimum flow rate of the refrigerant passing therethrough in accordance with the difference between the current desirable temperatures and the current refrigerant temperatures.

6. A control system for air-conditioner including an outdoor unit having at least a compressor and an outdoor heat exchanger, and an indoor unit having an expansion valve and an indoor heat exchanger, said indoor and outdoor sections connected with pipes for circulating a refrigerant, said control system comprising:
   temperature detection means for periodically detecting refrigerant temperature at the outlet of compressor of said compressor;
   means for establishing and correcting a desirable temperature based on change in the refrigerant temperatures measured by said temperature detection means;
   means for storing said corrected desirable temperature as the current desirable temperature, together with previous desirable temperature; and
   valve opening level correction means for controlling the opening of said expansion valve for optimum flow rate of the refrigerant passing therethrough in accordance with change in valve opening for said expansion valve calculated from said difference between the current desirable temperatures and the current refrigerant temperatures, and change in said difference.

7. A control system as claimed in claim 6, wherein said desirable temperature correction means and said valve opening level correction means employ a fuzzy estimation method in calculating said desirable temperature correction and said valve opening change.

* * * * *